(12) United States Patent
Seibert, Jr. et al.

(10) Patent No.: US 9,063,912 B2
(45) Date of Patent: Jun. 23, 2015

(54) MULTIMEDIA CONTENT PREVIEW RENDERING IN A CLOUD CONTENT MANAGEMENT SYSTEM

(75) Inventors: Jeffrey H. Seibert, Jr., Cambridge, MA (US); Kimber Lockhart, Mountain View, CA (US); Nicholas Silva, Mountain View, CA (US); Brandon Savage, San Carlos, CA (US); Aaron Levie, Palo Alto, CA (US); Sam Ghods, San Francisco, CA (US); Arnold Goldberg, Los Gatos, CA (US); Florian Jourda, San Francisco, CA (US); David T. Lee, Foster City, CA (US); Arshdeep Mand, Union City, CA (US)

(73) Assignee: Box, Inc., Los Altos, CA (US)

( * ) Notice: Subject to any disclaimer, the term of this patent is extended or adjusted under 35 U.S.C. 154(b) by 518 days.

(21) Appl. No.: 13/166,733

(22) Filed: Jun. 22, 2011

(65) Prior Publication Data

US 2012/0328259 A1    Dec. 27, 2012

(51) Int. Cl.
| | |
|---|---|
| *H04N 9/12* | (2006.01) |
| *G06F 17/21* | (2006.01) |
| *G06F 17/30* | (2006.01) |
| *H04N 21/2343* | (2011.01) |
| *H04N 19/61* | (2014.01) |

(52) U.S. Cl.
CPC ........ *G06F 17/212* (2013.01); *G06F 17/30076* (2013.01); *H04N 21/2343* (2013.01); *H04N 7/50* (2013.01)

(58) Field of Classification Search
CPC ............ G06F 17/212; G06F 17/30056; G06F 17/30076; G06Q 10/10; H04L 12/1813; H04N 1/3935; H04N 21/2343; H04N 7/50
See application file for complete search history.

(56) References Cited

U.S. PATENT DOCUMENTS

| | | | |
|---|---|---|---|
| 5,787,175 | A | 7/1998 | Carter |
| 5,799,320 | A | 8/1998 | Klug |
| 5,848,415 | A | 12/1998 | Guck |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Exam Report for EP13168784.0, Applicant: Box, Inc. Mailed Nov. 21, 2013, 7 pages.

(Continued)

*Primary Examiner* — Huy T Nguyen
(74) *Attorney, Agent, or Firm* — Perkins Coie LLP

(57) ABSTRACT

Systems and methods for providing content previews of files, including video files, stored in an online content management system with collaboration environment are disclosed. Permission to view a preview of a file is determined based upon access permissions associated with the file and/or workspace in which the file is stored and the access level of the requesting user. The system can also provide a progress indicator indicating the approximate time remaining to process the file for previewing based upon averages of times for processing previous files having similar attributes. In one aspect, embodiments of the present disclosure include a method, which may be implemented on a system, for downsampling a video file to decrease the processing time for providing a preview.

48 Claims, 13 Drawing Sheets

(56) References Cited

U.S. PATENT DOCUMENTS

| | | |
|---|---|---|
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,149,787 B1 | 12/2006 | Mutalik et al. |
| 7,155,483 B1 | 12/2006 | Friend et al. |
| 7,165,107 B2 | 1/2007 | Pouyoul et al. |
| 7,222,078 B2 | 5/2007 | Abelow |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,890,964 B2 | 2/2011 | Vogler-Ivashchanka et al. |
| 7,937,663 B2 | 5/2011 | Parker et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,214,747 B1 | 7/2012 | Yankovich et al. |
| 8,230,348 B2 | 7/2012 | Peters et al. |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,583,619 B2 | 11/2013 | Ghods et al. |
| 8,607,306 B1 | 12/2013 | Bridge et al. |
| 8,719,445 B2 | 5/2014 | Ko |
| 8,745,267 B2 | 6/2014 | Luecke et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,900 B2 | 12/2014 | Smith et al. |
| 2001/0027492 A1 | 10/2001 | Gupta |
| 2002/0029218 A1 | 3/2002 | Bentley et al. |
| 2002/0091738 A1 | 7/2002 | Rohrabaugh et al. |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1* | 11/2003 | Von Stuermer et al. ...... 709/231 |
| 2004/0021686 A1 | 2/2004 | Barberis |
| 2004/0088647 A1 | 5/2004 | Miller et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0117247 A1 | 6/2006 | Fite et al. |
| 2006/0123062 A1 | 6/2006 | Bobbitt et al. |
| 2006/0133340 A1* | 6/2006 | Rybak et al. ................. 370/338 |

(56) References Cited

U.S. PATENT DOCUMENTS

| | | |
|---|---|---|
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0242204 A1 | 10/2006 | Karas et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0038934 A1 | 2/2007 | Fellman |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1* | 5/2007 | Casey et al. ............ 725/94 |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0044128 A1* | 2/2009 | Baumgarten et al. ......... 715/738 |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0300527 A1 | 12/2009 | Malcolm et al. |
| 2009/0327358 A1 | 12/2009 | Lukiyanov et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1* | 9/2010 | Waupotitsch et al. ......... 701/207 |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |

(56) References Cited

U.S. PATENT DOCUMENTS

| | | |
|---|---|---|
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0093567 A1 | 4/2011 | Jeon et al. |
| 2011/0099006 A1 | 4/2011 | Sundararaman et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0137991 A1 | 6/2011 | Russell |
| 2011/0142410 A1* | 6/2011 | Ishii ............... 386/224 |
| 2011/0145744 A1 | 6/2011 | Haynes et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0209064 A1 | 8/2011 | Jorgensen et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0289433 A1 | 11/2011 | Whalin et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0192055 A1 | 7/2012 | Antebi et al. |
| 2012/0192086 A1 | 7/2012 | Ghods et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0257249 A1 | 10/2012 | Natarajan |
| 2012/0263166 A1 | 10/2012 | Cho et al. |
| 2012/0266203 A1* | 10/2012 | Elhadad et al. ............... 725/115 |
| 2012/0284638 A1 | 11/2012 | Cutler et al. |
| 2012/0284664 A1 | 11/2012 | Zhao |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138615 A1 | 5/2013 | Gupta et al. |
| 2013/0159411 A1 | 6/2013 | Bowen |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198600 A1 | 8/2013 | Lockhart et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0326344 A1 | 12/2013 | Masselle et al. |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0068589 A1 | 3/2014 | Barak |
| 2014/0150023 A1 | 5/2014 | Gudorf et al. |
| 2014/0156373 A1 | 6/2014 | Roberts et al. |
| 2014/0172595 A1 | 6/2014 | Beddow et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |

(56) References Cited

FOREIGN PATENT DOCUMENTS

| | | |
|---|---|---|
| KR | 20050017674 | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.

Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/035404, Applicant: Box, Inc., Mailed Jun. 26, 2013, 13 pages.
International Search Report and Written Opinion for PCT/US2011/039126 mailed on Oct. 6, 2011, pp. 1-13.
Partial International Search Report for PCT/US2011/041308 dated Feb. 27, 2012, pp. 1-2.
International Search Report and Written Opinion for PCT/US2011/056472 mailed on Jun. 22, 2012, pp. 1-12.
Langfeld L. et al., "Microsoft SharePoint 2003 Unleashed," Chapters 11 and 15, Jun. 2004, pp. 403-404, 557-561, 578-581.
International Search Report and Written Opinion for PCT/US2011/041308 Mailed Jul. 2, 2012, pp. 1-16.
U.S. Appl. No. 13/030,090, filed Feb. 17, 2011, Ghods et al.
U.S. Appl. No. 13/152,982, filed Jun. 3, 2011, Ghods et al.
U.S. Appl. No. 13/165,725, filed Jun. 21, 2011, Trombley-Shapiro et al.
U.S. Appl. No. 13/208,615, filed Aug. 12, 2011, Lee et al.
International Search Report PCT/US2008/012973 dated Apr. 30, 2009, pp. 1-3.
Supplementary European Search Report European Application No. EP 08 85 8563 dated Jun. 20, 2011 pp. 1-5.
Written Opinion PCT/US2008/012973 dated Apr. 30, 2009, pp. 1-4.
International Search Report and Written Opinion for PCT/US2011/060875 Mailed Oct. 30, 2012, pp. 1-10.
"Revolving sync conflicts; frequently asked questions," Microsoft Tech Support, Jul. 16, 2012, retrieved from the Internet: http://web.archive.org/web, 2 pages.

(56) References Cited

OTHER PUBLICATIONS

"Troubleshoot sync problems," Microsoft Tech Support: May 2, 2012, retrieved from the internet, http://web. Archive.org/web, 3 pages.
"Tulsa TechFest 2012—Agenda," retrieved from the website, http://web.archive.org, Oct. 2, 2012, 2 pages.
Cohen, "Debating the Definition of Cloud Computing Platforms," retrieved from the internet, http://forbes.com, Feb. 3, 2014, 7 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1312264.3, Applicant: Box, Inc. Mailed Mar. 24, 2014, 7 pages.
Exam Report for GB1318792.7, Applicant: Box, Inc. Mailed May 22, 2014, 2 pages.
John et al., "Always Sync Support Forums—View topic—Allway sync funny behavior," Allway Sync Support Forum at http://sync-center.com, Mar. 28, 2011, XP055109680, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Rao, "Box Acquires Crocodoc To Add HTML5 Document Converter And Sleek Content Viewing Experience To Cloud Storage Platform," retrieved from the internet, http://techcrunch.com, May 9, 2013, 8 pages.
Search Report for EP13187217.8, Applicant: Box, Inc. Mailed Apr. 15, 2014, 12 pages.
Search Report for EP141509422, Applicant: Box, Inc. Mailed May 8, 2014, 7 pages.
Search Report for EP14151588.2, Applicant: Box, Inc. Mailed Apr. 15, 2014, 12 pages.
Search Report for EP14153783.7, Applicant: Box, Inc. Mailed Apr. 3, 2014, 6 pages.
Sommerer, "Presentable Document Format: Improved On-demand PDF to HTML Conversion," retrieved from the internet, http://research.microsoft.com, 8 pages.
Tulloch et al., "Windows Vista Resource Kit," Apr. 8, 2007, Microsoft Press, XP055113067, 6 pages.
Walker, "PDF.js project meeting notes," retrieved from the internet, http://groups.google.com, May 15, 2014, 1 page.
Exam Report for GB1314771.5, Applicant: Box, Inc. Mailed Feb. 17, 2014, 7 pages.
Exam Report for GB1308842.2, Applicant: Box, Inc. Mailed Mar. 10, 2014, 4 pages.
Burns, "Developing Secure Mobile Applications for Android," Oct. 2008, Version 1.0, 1-28 pages.
Search Report for EP 11729851.3, Applicant: Box, Inc. Mailed Feb. 7, 2014, 9 pages.
Comes, "MediaXchange User's Manual," Version 1.15.15, Feb. 1, 2009, pp. 1-90.
"Average Conversion Time for a D60 RAW file?" http://www.dpreview.com, Jul. 22, 2002, 4 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
Cisco, "FTP Load Balancing on ACE in Routed Mode Configuration Example," DocWiki, Jun. 2011, 7 pages.
Palmer, "Load Balancing FTP Servers," BlogNav, Oct. 2008, 2 pages.
Wayback, "Wayback machine," Wayback, Jun. 1, 2011, 1 page.
"Agilewords—How to Request Approval," YouTube, http://www.youtube.com/watch?v=3Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.

\* cited by examiner

Updates [23] | Files | Contacts | Apps | Philip Johnson (Upgrade) | Secondary Button Jump to folder
Reporting projects

Files and folders | Discussions

[Upload] [+ New ...] | Q Search files

Sort by: Date ▼ | Prev 1 of 7 ▼ Next

↑ Jeremy Farmer Uploaded: 5 files in this folder. View latest updates ✕

📁 Analytics and Optimization Training
Updated Mar 8, 2010 by Menaka . 9 files . 132.4MB 📁 Icons
Updated Nov 25, 2009 by You . 172 files . 380.7KB 📁 Fonts
Updated Nov 10, 2009 by You . 1 file . 560.3KB 📄 Marketing Principles.ppt    1 Task   Shared
Updated Jul 12, 2010 by Jen Smith . 5.2MB 📄 SD Forum Notes.webdoc    Tasks   Shared
Updated Apr 11, 2010 by Menaka . 8.2KB 📄 GTM template.xlsx    Tasks   Share
Created Apr 7, 2010 by Menaka . 12.3KB 📄 Form landing pages.xls
Created Feb 25, 2010 by Menaka . 20.0KB
Penny: this lists all the partner/form pages that I could find in analytics

34 Collaborators ▼
- Jen Smith Owner
- You Editor
- Aaron Frank
- Sean Jones
- Aaron Wall
- Amy Chip
- Karen Hennery
- Jim Avery Co-owner

Enter email addresses here
   👥 Invite Collaborators

Account   UPGRADE
🔒 Storage: 16.0GB of 75.0GB

850
- Jeremy Farmer Upl... 5 Files to Reporting project — 852
- David Ark Commented on: Picture of Soham.jpg — 854
- Peter Frost downloaded GTM template.xlsx — 856

MULTIMEDIA CONTENT PREVIEW RENDERING IN A CLOUD CONTENT MANAGEMENT SYSTEM

CROSS-REFERENCES TO RELATED APPLICATIONS

This application is related to co-pending U.S. application Ser. No. 13/152,982, entitled, "REAL TIME NOTIFICATION OF ACTIVITIES THAT OCCUR IN A WEB-BASED COLLABORATION ENVIRONMENT", filed Jun. 3, 2011 and is incorporated in its entirety.

BACKGROUND

Online file storage systems typically provide a way for a user to upload files to a storage server for backing up files, file access, and/or file distribution. Some online file storage systems allow the user to preview the contents of a file before or instead of downloading the file.

BRIEF DESCRIPTION OF THE DRAWINGS

Examples of a web-based content management system with a collaboration environment that provides previewing of files are illustrated in the figures. The examples and figures are illustrative rather than limiting.

FIG. 10 depicts a screenshot showing an example of a user interface of a file page with a feed stream of real time or near real time notifications of activities that occur in a web-based collaboration environment.

DETAILED DESCRIPTION

A system is described for providing content previews of files stored in an online content management system with a collaboration environment. Each collaborator of a workspace in the collaboration environment is assigned a permission level or has a default permission level. Permission to view a preview of a file is determined based upon access permissions associated with the file and/or workspace in which the file is stored and the access level of the requesting user.

Further, the system can provide a visual indicator, such as a progress bar, that indicates the time remaining to process a file for previewing. The anticipated duration for processing a file is based upon averages of times needed to process previous files having similar attributes. Additionally, embodiments of the present disclosure include a method for downsampling a video file to decrease the processing time for providing a preview.

Various aspects and examples of the invention will now be described. The following description provides specific details for a thorough understanding and enabling description of these examples. One skilled in the art will understand, however, that the invention may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the technology. Certain terms may even be emphasized below; however, any terminology intended to be interpreted in any restricted manner will be overtly and specifically defined as such in this Detailed Description section.

Figure 1:
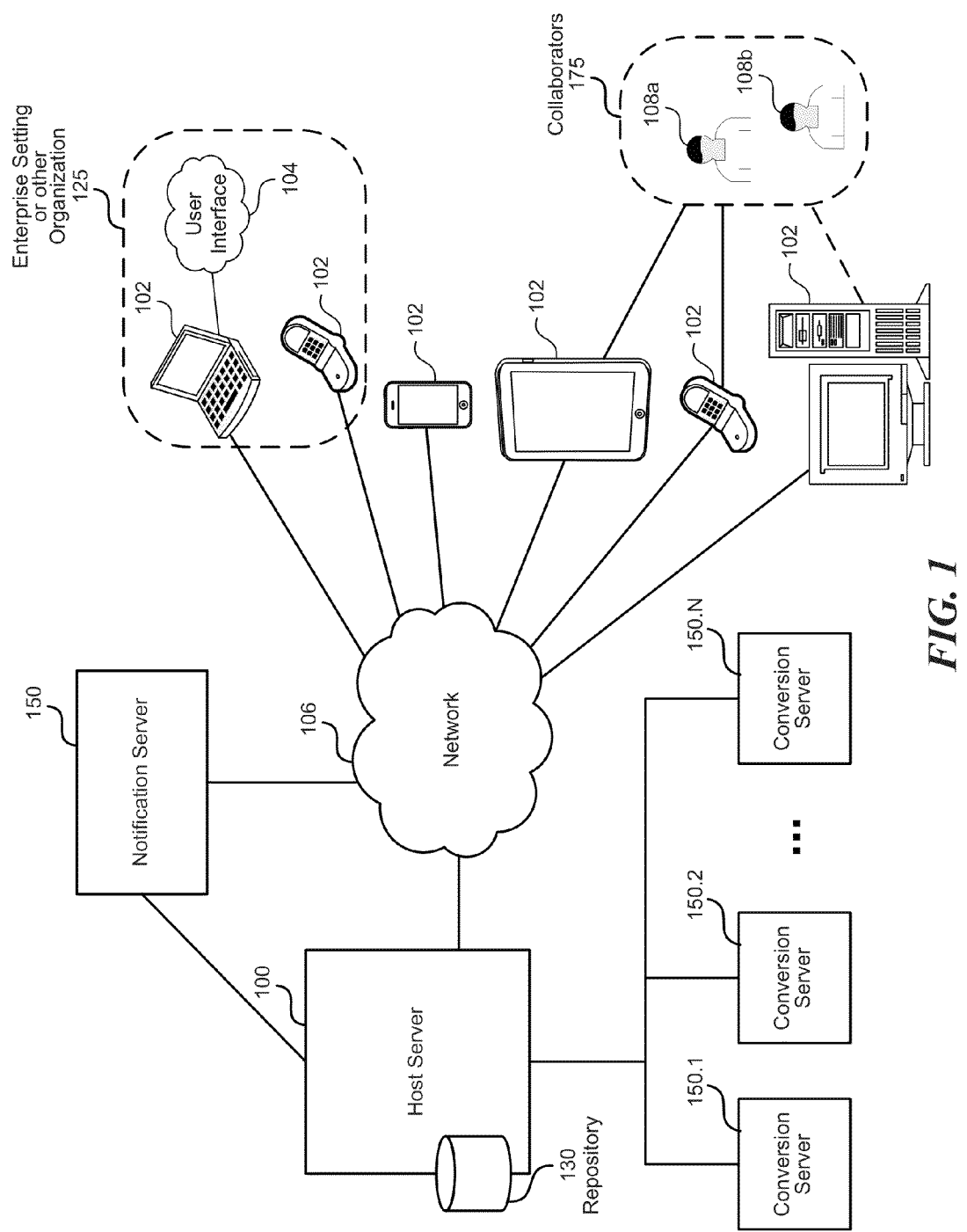
FIG. 1 illustrates an example diagram of a system where a host server and conversion servers support previewing of files in an online collaboration environment.

FIG. 1 illustrates an example diagram of a system where a host server 100 and conversion servers 150 support previewing of files for users 108 in an online collaboration environment so that the users 108 do not have to download the file to access its contents. Further, the host server 100 and notification server 150 provide notifications of activities that occur in the online collaboration environment in ire realtime or near real time to users 108.

The client devices 102 can be any system and/or device, and/or any combination of devices/systems that is able to establish a connection, including wired, wireless, cellular connections with another device, a server and/or other systems such as host server 100 and/or conversion servers 150. Client devices 102 will typically include a display and/or other output functionalities to present information and data exchanged between or among the devices 102 and/or the host server 100 and/or conversion servers 150. In one embodiment, this is only a single conversion server 150. In one embodiment, there are multiple conversion servers 150 working independently. In other embodiments, a distributed queuing system is used to run the conversion servers 150 in an efficient manner.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. In one embodiment, the client devices 102, host server 100, and conversion servers 150 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, discussions, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such that each user can see, remotely, edits, revisions, comments, or annotations being made to specific work items through their own user devices. For example., a user can upload a document to a work space for other users to access (e.g., for viewing, editing, commenting, discussing, signing-off, or otherwise manipulating). The user can login to the online platform and upload the document (or any other type of work item) to an existing work space or to a new work space. The document can be shared with existing users or collaborators in a work space.

Figure 2:
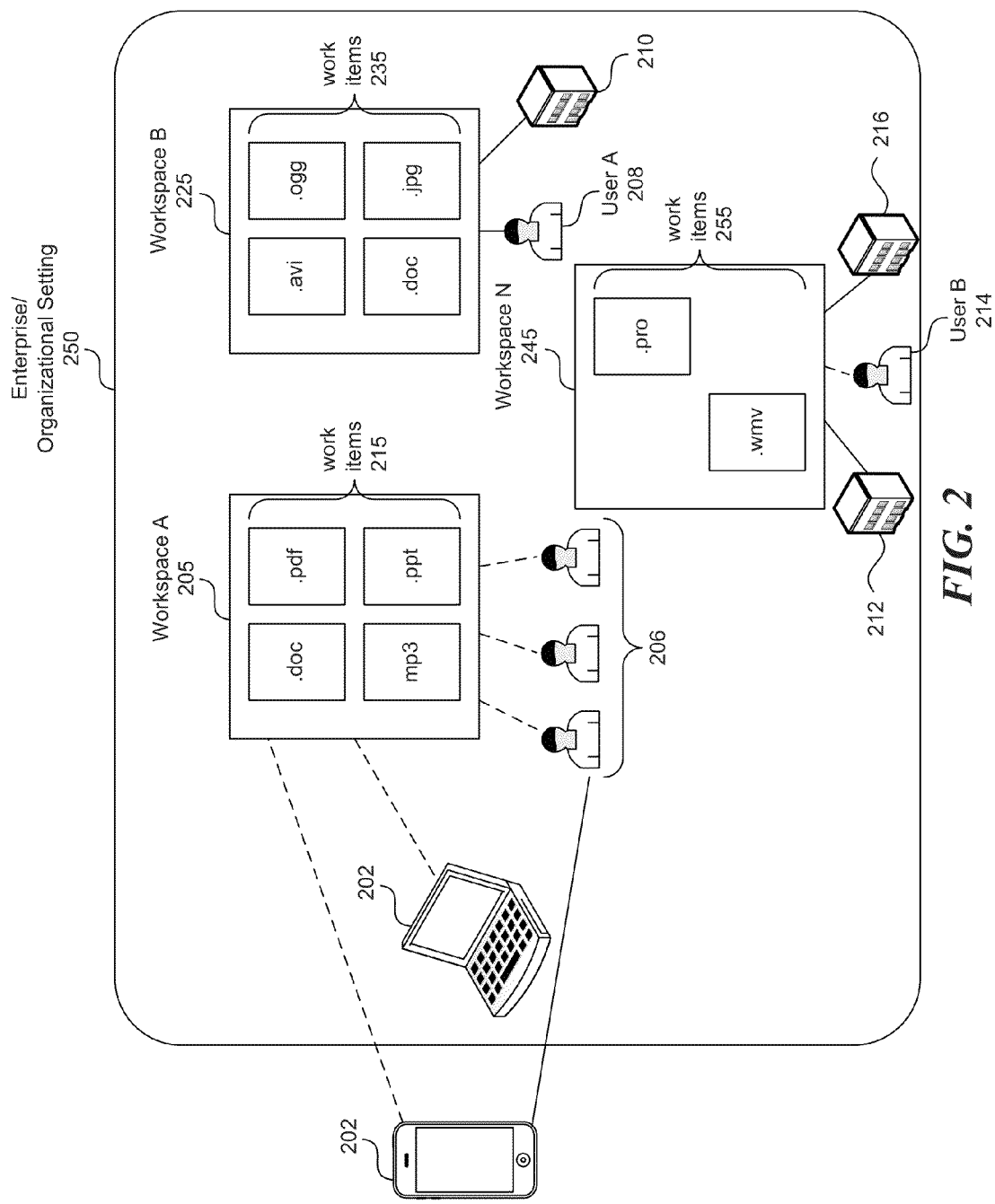
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2.

In one embodiment, actions performed on work items or other activities that occur in a work space can be detected in real time or in near real time. In addition, users, collaborators, or select users can be notified in real time or near real-time of these actions or activities. Various mechanisms can be used to notify users or collaborators, including through the web interface to access the collaboration platform, via email, and/or SMS, for example.

Functions and techniques disclosed for previewing of files or work items in the online platform can be performed by one or more distributed conversion servers 150 of the collaboration platform. Functions and techniques performed by the host server 100, the conversion servers 150, and the related components therein are described, respectively, in detail with further reference to the examples of FIGS. 3A and 4.

In one embodiment, client devices 102 communicate with the host server 100 and/or conversion servers 150 over network 106. In general, network 106, over which the client devices 102, the host server 100, and/or conversion servers 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associated work items. For example, work space A 205 may be associated with work items 215, work space B 225 can be associated with work items 235, and work space N 245 can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B . . . N, when an action is performed on a work item by a given user or any other activity is detected in the work space, other users in the same work space may be notified in real time or in near real time. Activities which trigger real time notifications can include, by way of example but not limitation, adding, deleting, or modifying collaborators in the work space, adding, deleting a work item in the work space, creating a discussion topic in the work space.

The activity can be performed in relation to a discussion topic in the work space, for example, adding a response to a discussion topic, deleting a response, or editing a response in the work space. In addition, the activity is performed on a work item in the work space by the user, including, by way of example but not limitation, download or upload of a work item, deletion of editing of the work item, selecting, adding, deleting, and modifying a tag in the work item, preview of the work item or comment of the work item, setting or changing permissions of the work item, sharing a work item, emailing a link to the work item, and/or embedding a link to the work item on another website.

Figure 3A:
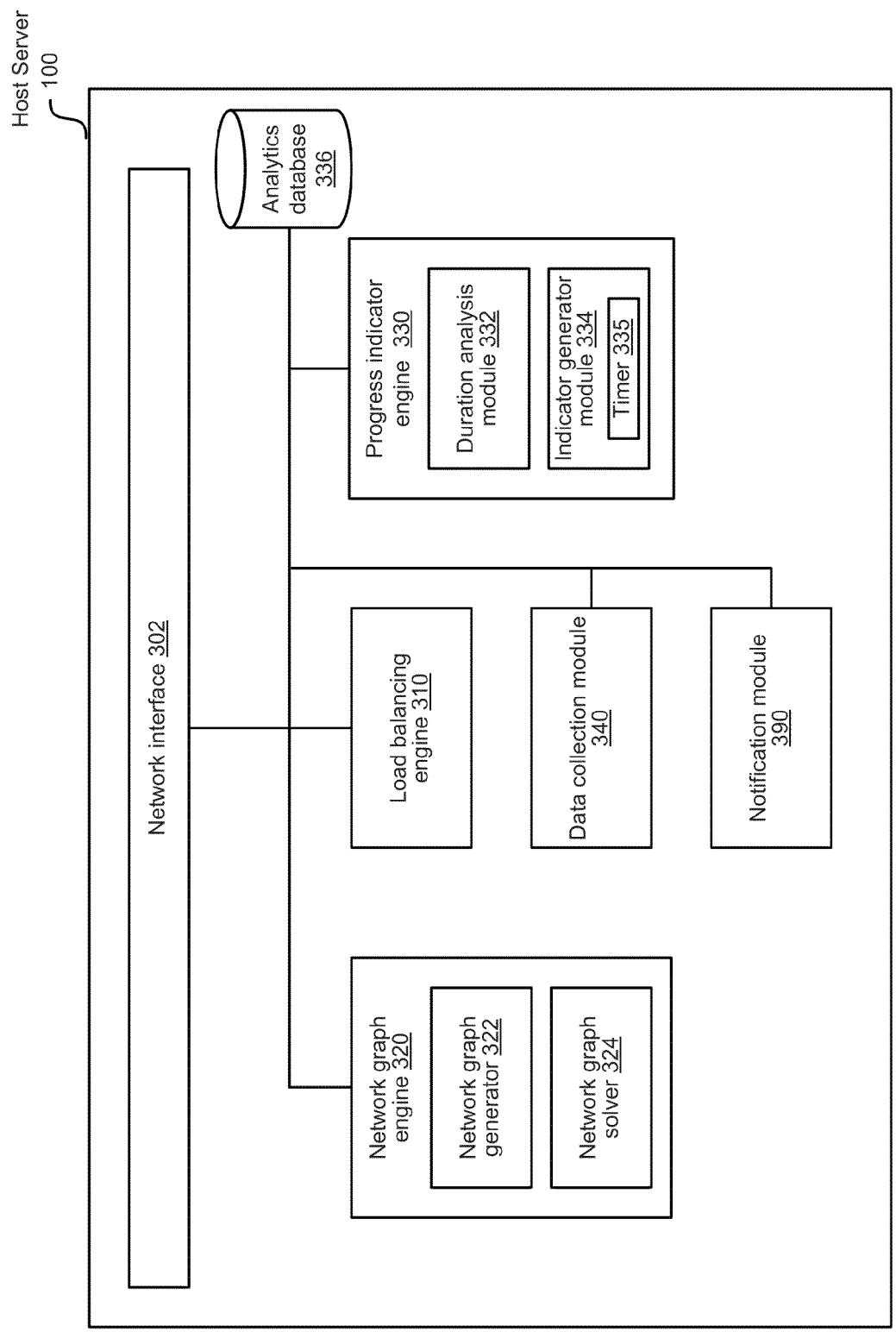
FIG. 3A depicts a block diagram illustrating an example of components in the host server of a web-based collaboration environment that supports previewing of files.

FIG. 3A depicts a block diagram illustrating an example of components in the host server 100 of a web-based collaboration environment that supports previewing of files.

The host server 100 of the web-based or online collaboration environment can generally be a cloud-based service. The host server 100 can include, for example, a network interface 302, a load balancing engine 310, a network graph engine 320, an analytics database 336, and/or a progress indicator engine 330, and a data collection module 340. Additional or fewer components/modules/engines can be included in the host server 100 and each illustrated component.

The network interface 302 can be a networking module that enables the host server 100 to mediate data in a network with an entity that is external to the host server 100, through any known and/or convenient communications protocol supported by the host and the external entity. The network interface 302 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable. (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 100 includes the data collection module 340 which performs real time collection of statistics on every job that runs through the conversion servers 150 during the conversion process. Some file formats do not need to be converted to any intermediate formats before being converted to the target format. These file formats can be converted in a single step. Other file formats use one or more intermediate steps to convert to intermediate formats before finally being converted to the target format. The data collection module 340 records the timing information for every step of the file conversion process and stores the information in the analytics database 336. By collecting timing data for every job and analyzing the data to optimize the number of jobs processed per server in a given amount of time, the overall throughput of jobs can be maximized by the system.

One embodiment of the host server 100 includes the load balancing engine 310 which can evaluate the load on each of the distributed conversion servers 150 and use a distributed queuing system to determine which of the distributed conversion servers 150 to send the next job. In one embodiment, jobs are sent to a particular conversion server based upon a round-robin process where each job is sent to a different server until every server has received a job, and further jobs are sent to the servers in the same order. In one embodiment, video conversion jobs can be queued in a cluster separately from other conversion jobs because video conversion can take longer than conversion of other types of files. Then for each cluster of jobs, the round-robin process would be used among the servers. Additionally, other classes of files could also be queued in their own special clusters, as the need arises.

One embodiment of the host server 100 includes the network graph engine 320 which can identify and evaluate the available tools for converting files from an existing format to a target format and generate a network graph to determine the optimum tool or tools to use for the conversion process of a given file. The network graph engine 320 can include a network graph generator 322 and a network graph solver 324.

The network graph generator 322 maintains information on the tools available in the system for converting files. Each tool has a list of supported input formats and one or more output formats to which the tool can convert a file. Based upon the input and output formats, the network graph generator 322 generates a network graph. The network graph is made up of nodes that represent a tool that can be used to convert a particular input file format to a particular output file format. The nodes are then connected so that the output format of a first node is connected to a second node that takes the output format as an input format. Every conversion tool available to the system and every pair of supported input-output formats is assigned to a different node, and the appropriate connections between the nodes are made, thus generating a network graph of conversion tools.

The network graph generator 322 maintains a priority cost associated with each tool for each set of input to output conversion function. The priority cost can be based on factors including, but not limited to, how long a particular conversion tool takes to perform a conversion, the fidelity of the output file of the conversion tool, and system preferences for conversion of a file into a particular file format. In one embodiment, conversion tools that convert the same input file formats to the same output file formats but use a different algorithm, e.g. ffmpeg versus mencoder, can be maintained with different priority costs for different file formats. In one embodiment, specific versions of conversion tools can also be maintained because a particular version performs better for a desired input-output file format conversion. For example, with the swftools library, an older version provides higher quality results for particular conversion situations. As a result, upgrading to the latest version degrades the quality of the output file. Thus, a node can be associated with each installed version of the conversion tool with specified input, output, and priority costs.

Based upon the priority cost, the network graph generator 322 solves the network graph to find the optimum conversion scenario for a given input file format and target output file format. If during the conversion of a file a particular conversion tool fails to create a sufficient output file, the network graph generator 322 can remove the effected node(s), and the network graph solver 324 can re-solve the network graph to re-route the conversion of the file around the fault.

One embodiment of the host server 100 includes the progress indicator engine 330 which can generate a progress bar or other type of progress indicator for display to the user to let the user know the approximate amount of time remaining for a file conversion to complete and when a display of the desired file preview will be available. The progress indicator engine 330 can include a duration analysis module 332 and/or an indicator generator 334 and can access the analytics database 336.

The duration analysis module 332 accesses data collected and stored in the analytics database 336 about previous files that have been converted by the system. The analytics database 336 includes, but is not limited to, data such as the size of a file and the format of the file. For text files, the data includes the number of pages of the file. For image and video files, the data includes the width and height of the source image format and the target image format, for example in number of pixels. For video files, the data also includes the play length of the video. The database can also include information about the number of steps used to convert the input file format to the target file format, for example, the number of intermediate file formats that the input file format needs to be converted to before reaching the final target format. In one embodiment, the analytics database 336 can be made up of several separate databases. In one embodiment, the analytics database 336 can be external to the conversion server 150 and/or shared by the conversion servers 150.

The duration analysis module 332 can find previous files that have similar attributes as the file to be converted and calculate a predicted conversion time based on the conversion times of similar files that have been converted in the past. In one embodiment, the duration analysis module 332 takes an average of the conversion times of the similar files as a predicted conversion duration for the file to be converted. In one embodiment, the duration analysis module 332 can perform a more complex calculation on the collected analytics data, for example, a weighted average depending upon how similar a previous input file is to the present file to be converted, to predict the conversion time for the present file. In one embodiment, the predicted conversion duration can be further refined by the duration analysis module 332 based on any steps of the conversion process that operate linearly and can report its progress.

Further, the analytics database 336 can include data on the load on the conversion servers at the time the previous files were converted. In one embodiment, the conversion server can comprise a number of distributed servers. By determining the load on the conversion servers when a file is to be converted to a target format, the average of the conversion times of similar files can be adjusted to the current load of the servers.

The indicator generator module 334 generates the progress indicator for displaying an indication of the time that has elapsed since the start of the conversion of the file and the expected time remaining until the file has finished converting to the target format. The indicator generator module 334 includes a timer 335 for tracking the elapsed time from when the conversion process starts to when the conversion process has finished.

In some embodiments, a video file can start to be streamed to the user prior to completion of the conversion process. In this case, the timer 335 tracks the elapsed time from when the conversion process starts to the anticipated time when the video player can start reading data and showing video to the user before the remainder of the file has been converted to the target format.

Figure 3B:
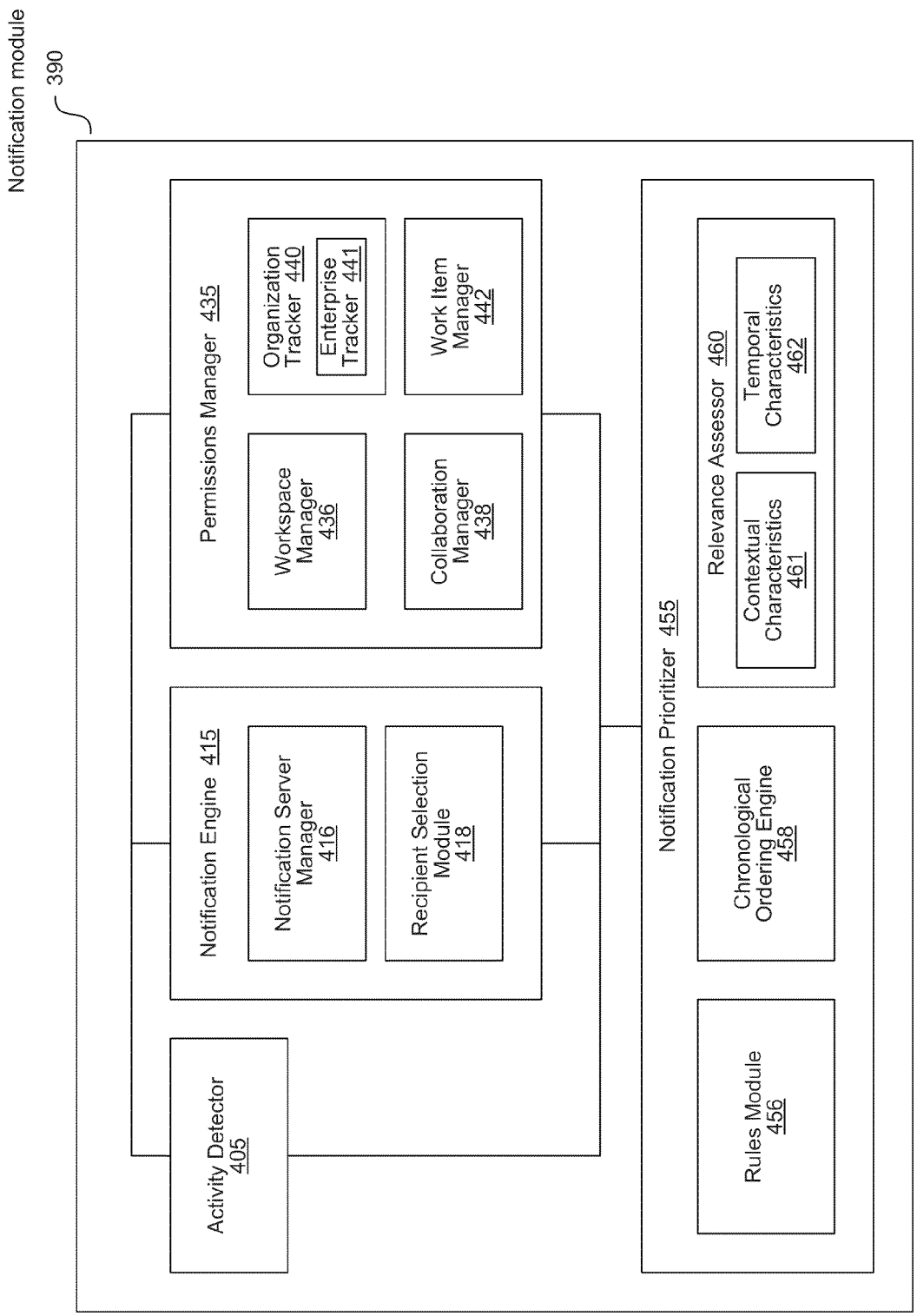
FIG. 3B depicts a block diagram illustrating an example of components in the host server of a web-based collaboration environment with real time activity notification capabilities.

FIG. 3B depicts a block diagram illustrating an example of components in the notification module 390 that is part of the host server 100 of a web-based collaboration environment with real time activity notification capabilities.

The notification module 390 can include, for example, an activity detector 405, a notification engine 415, a permissions manager 435 and/or a notification prioritizer 455. The notification engine 415 can include a notification server manager 416 and/or a recipient selection module, the permission manager 435 can include a workspace manager 426, a collaboration manager 438, an organization tracker 440 having an enterprise tracker 441, and/or a work item manager 442; the notification prioritizer 455 can further include a rules module 456, a chronological ordering engine 458, and/or a relevance assessor 460. Additional or less components/modules/engines can be included in the notification module 390 and each illustrated component.

One embodiment of the notification module 390 includes the activity detector 405 which can detect an activity in the web-based collaboration environment. The activity can be a triggering activity which causes select or relevant users to be notified of the occurrence, which in one embodiment, is in real time or near real-time.

The detected activity can be performed by a user or collaborator in a work space and can be performed on a work item or relating to a work item, for example, download or upload of the work item, previewing, commenting of a work item, deletion or editing of the work item, commenting on a work item, identifying, selecting, adding, deleting, saving, editing, and modifying a tag in the work item, setting or changing permissions of the work item, sharing the work item including, for example, emailing a link to the work item, embedding a link to the work item on another website.

The types of activities that can be detected can also relate to changes to a work space, such as adding, deleting, or modifying collaborators in the work space; changes to work items such as adding, deleting a work item in the work space; creating a discussion topic in the work space, adding a response to a discussion topic, deleting a response, or editing a response in the work space.

Detected activity in a work space that is performed by a user or otherwise occurring can trigger notifications to be sent out, for example, via the notification engine 415. The notification engine 415 can notify users, which can be collaborators of the user who performed the activity in the work space via one or more of many mechanisms, including but not limited to, email, SMS, voice-message, text-based message, RSS, feed, etc.

In one embodiment, the notification is depicted through a web-browser used by the other user to access the web-based collaboration environment, for access in real time or near real time to when the activity was performed by the user. When notifying a user in real time through a web-browser, the notification engine 415 can utilize a push-enabled service to ensure real time notification. In one embodiment, the notification is sent by a component or another server which implements push technology (e.g., the notification server 500 shown in the example of FIG. 3C). The push-enabled service can be implemented via long poll or HTTP streaming, for example, by the notification sever 500 or another component, device which may be internal to or external to the host server 100.

The notification module 390 can send a notification server an identification of the recipient to be notified and indicator of the activity to notify the recipient of. Use of an external push server, such as the notification server 550 is described with further reference to the example of FIG. 3C. The notification server 550 can be managed by the notification server manager 416 in the notification engine 415 which can communicate events to notify users in real-time via their browser interfaces. In one embodiment, the host server sends a notification server an identification of the recipient to be notified and indicator of the activity to notify the recipient of.

In general, recipients of an activity notification are selected based on criteria, for example, by the recipient selection module 418 of the notification engine 415. The criteria may be determined, for example, based on a work space in which the activity was performed in the online collaboration platform. Specifically, the criteria, is in one embodiment, determined based on permissions configured for the workspace, as managed, tracked, updated, implemented, revised, based by the permissions manager 435.

For example, the workspace can be associated with an enterprise and in such an instance, the criteria can specify that the recipient that is selected is an employee of the enterprise. Enterprise associations and affiliations can be managed by the organization tracker 440, for example; in some embodiments, enterprises and/or enterprise accounts can specifically be managed, tracked, monitored by the enterprise tracker 441. Permissions for the workspace can configured by a creator or administrative user of the workspace. The collaboration manager 438 can determine, track, and implement relationships, roles, and/or access levels of multiple users/collaborators. For example, users may be a general user, a creator of the work space, a creator of a work item, or an administrative user. The permissions for a work space can be configured by a user, creator, or the administrative user and is generally managed by the collaborations manager 438.

The criteria that are determined by work space permissions can be managed by the work space manager 436 in the permissions manager 435. The recipient selection module 418 can also determine the recipient selection criteria based on user affiliation with the workspace, including, one or more of, member, invited collaborator and collaborator in the workspace. Such user affiliation can be tracked and managed by, for example, the collaboration manger 438 of the permissions manager 435.

In one embodiment, the criteria are determined based on permissions associated with a work item on which the activity was performed in relation to in the workspace. Permissions associated with work items can be managed, tracked, updated, revised, or implemented, in one embodiment, by the work item manager 442. For example, the permissions associated with the work item can be set by, a creator of the work item or an administrative user of the work space. Each work space can include multiple work items where each of multiple work items has individually configurable permissions. The individually configured permissions can be determined by user roles and rights (e.g., as managed by the collaborations manager 438). The work item manager 442 can communicate with the collaboration manager 438 in setting, configuring, or re-configuring permissions associated with work items.

Figure 11:
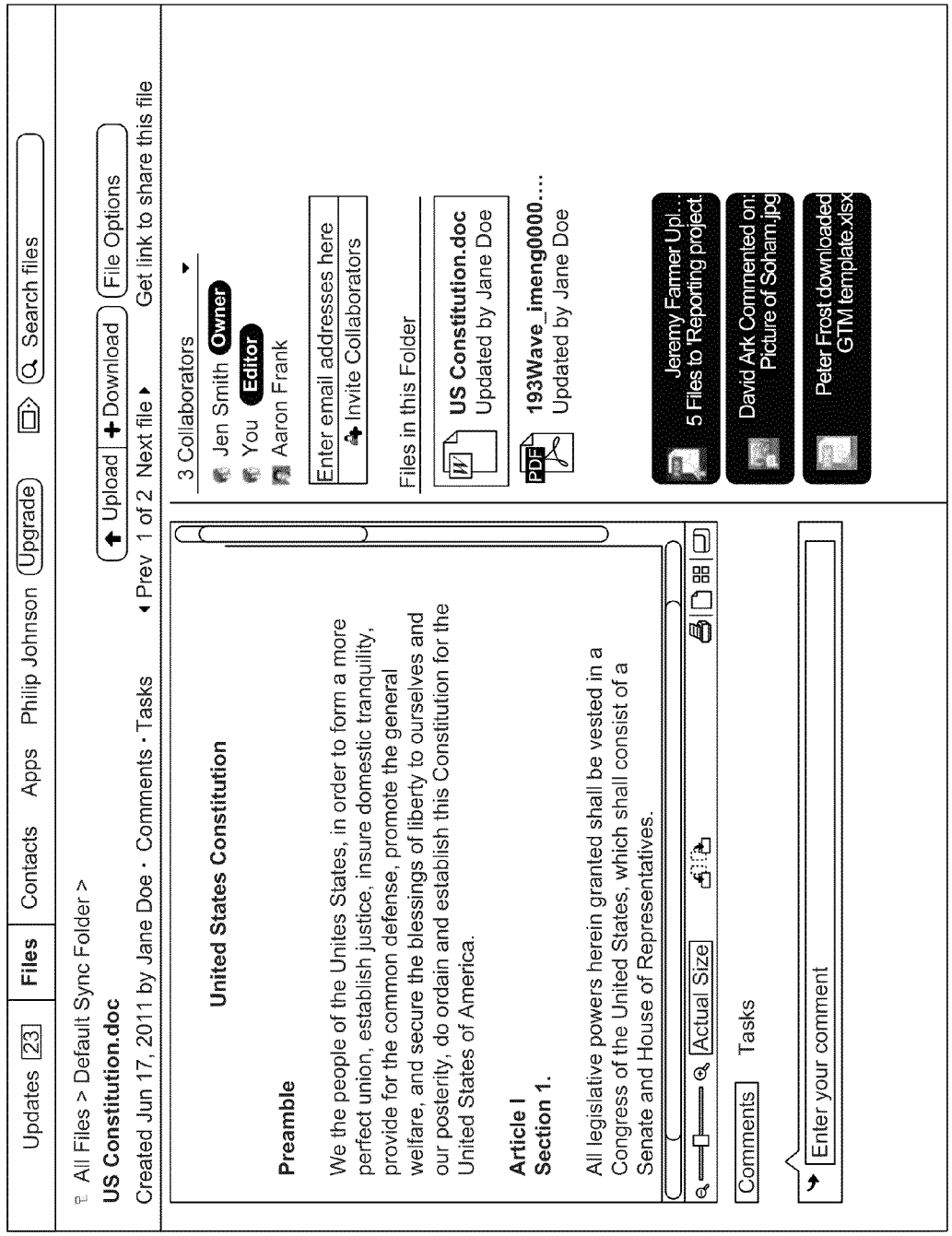
FIG. 11 depicts a screenshot showing an example of a user interface of a preview page with a feed stream of real time or near real time notifications of activities that occur in a web-based collaboration environment.

The notification of a triggering activity, can be presented to a selected user in the web-based or online collaboration environment such that the notification is accessible by the user in real time or near real time to when the triggering activity occurred. In one embodiment, the notification is presented via a user interface to the online collaboration platform, for example, when the recipient (e.g., selected recipient) is accessing the workspace (e.g., the same work space in which activity is detected) or when the recipient is accessing a different work space. Specifically, the real time or near real time notification can be presented to the user via the user interface if the user is online (e.g., online or otherwise logged into the web-based or online collaboration environment). Examples of real time notifications are illustrated with further reference to the examples of FIG. 10 and FIG. 11. The feed stream is shown in the lower right corner of the files page in FIG. 10 and the preview page in FIG. 11.

The notification engine 415 can determine the channel through which to notify selected users or recipients of activity. The channels that are used can include, indicators via a user interface to the online collaboration environment, SMS, audio message, text-based messages, email, desktop application, RSS, etc. The indicators presented via the user interface can include visual indicators (e.g., pop-up form including text and/or graphics), audio indicators, or any other types detectable by a user.

In one embodiment, the notification is presented in the user interface among other notifications in an order based a rule, which may be configurable by the recipient or another user. Such prioritization in presentation can be determined, managed, tracked, implemented, revised, or updated by the notification prioritizer 455, for example. The notification prioritizer 455 can present the notification in the user interface (e.g., as shown in the user interface of FIG. 10) among other notifications in an order based on a rule as determined by the rules module 456, for example.

The rule can indicate user preferences for notifications of activities based on one or more of, a type of activity that occurred and a user related to the activity. For example, a given user may explicitly or implicitly indicate preferences for activities or actions performed by specific other users or collaborators. A user may also indicate explicitly or implicitly preferences for types of activities that they wish to be notified of or not notified of. Users may also indicate that notifications for certain types of activities are to be prioritized other others. For example, a user may indicate that a notification for a 'comment on' activity is of a higher priority compared to a 'edit' activity.

In one embodiment, the notification is presented in the user interface among other notifications based on chronological order, for example as tracked or determined by the chronological ordering engine 458. For example, each notification can be depicted in the user interface based the time ordering when each associated triggering activity occurred. Notification of the most recently occurred activity can be depicted above or below other notifications, or in a location where most easily accessed by the recipient user.

In one embodiment, the notification is presented in the user interface among other notifications based on relevance to the recipient, for example, as determined, tracked, monitored, or implemented by the relevance assessor 460. The relevance to the recipient can be represented by, for example, contextual and temporal parameters. For example, contextual parameters provide metrics indicating the recipient's current activity in the online collaboration platform. Current activity can be any activity of the user that occurred within a certain time frame (e.g., within the last minute, within the last 5 minutes, within the last 10 minutes, for example). Activity of the user can include, a document that the user edited, viewed, downloaded, commented on, tagged, or otherwise accessed. Activity of the user can also include activities surrounding a workspace, including creation/modification of a workspace or attributes of a workspace, such as modification of collaborators, permissions, etc.

Temporal parameters can, for example, provide metrics indicating the recipient's activities in the online collaboration platform over a period of time, a frequency with which the recipient has accessed a work item with which the activity relates to, and/or a frequency with which the recipient has accessed the work space in which the activity was performed.

Figure 3C:
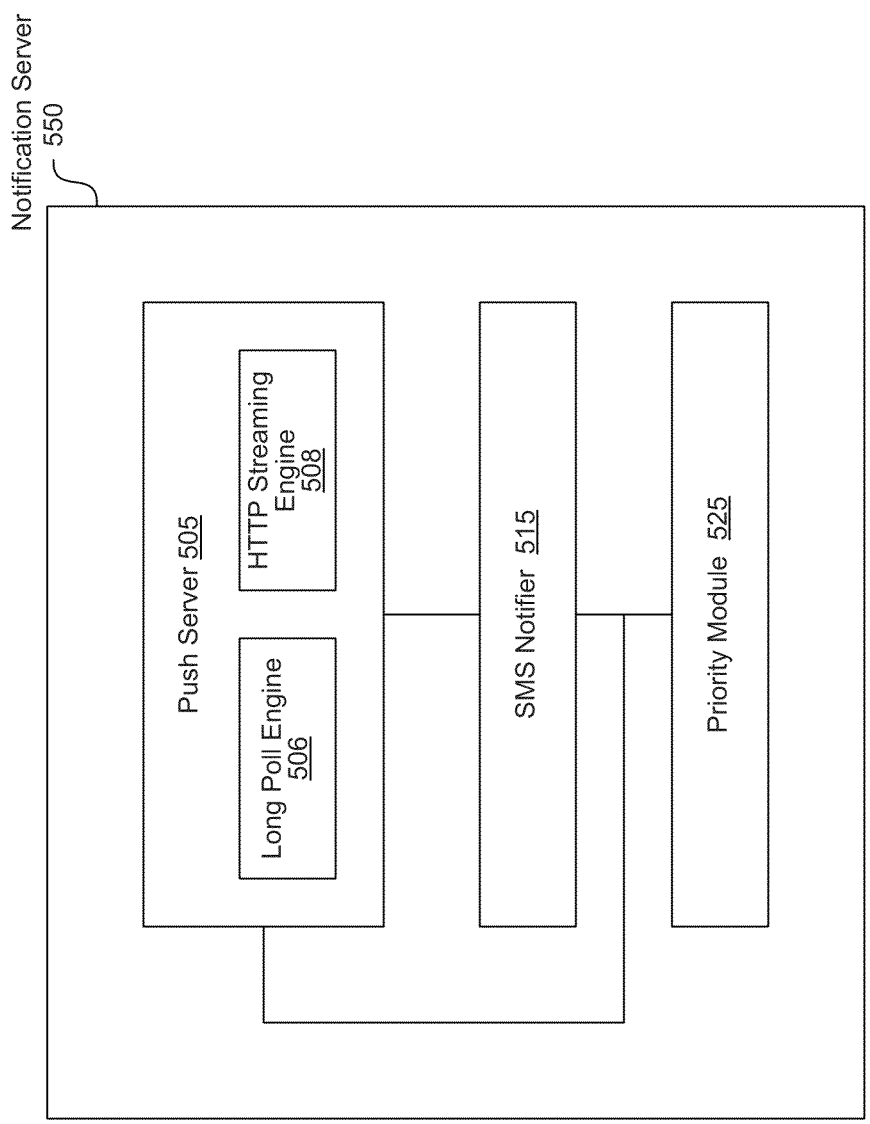
FIG. 3C depicts a block diagram illustrating an example of components in a notification server for providing real time or near real time notifications of activities that occur in a web-based or online collaboration environment.

FIG. 3C depicts a block diagram illustrating an example of components in a notification server 550 for providing real time or near real time notifications of activities that occur in a web-based or online collaboration environment.

The notification server 550 generally includes, for example, a push server 505, an SMS notifier 515, and/or a priority module 525. In one embodiment, the push server 505 includes a long poll engine 506 and/or an HTTP streaming engine 508. Additional or less components/modules/engines can be included in the notification server 550 and each illustrated component.

The notification server 550 can support the services of a collaboration platform or environment to provide real time or near real time notifications of activities. In one embodiment, the notification server 550 is integrated within a host server of a collaboration platform (e.g., the host server 100 shown in the example of FIG. 1). The notification server 550 may also be externally coupled to the host server (e.g., the host server 100). In some instances, a portion of the functions implemented and performed by the notification server 550 can be implemented in part or in whole in the host server 100. For example, some of the components shown to be in the notification server 500 and associated functionalities can in part or in whole reside in the host server 100.

In one embodiment, the notification server 550 sends a notification of an activity that occurs within a collaboration platform to a recipient. The notification is sent by the server 550 such that the recipient is notified in real time or near real time to when the activity occurred or when the activity was performed. Real time notification can be performed via push technology, for example by the push server 505 through long polls (e.g., via the long poll engine 506) and/or through the HTTP streaming (e.g., via the HTTP streaming engine 506). The notification server 550 can communicate with the host server to determine a recipient to whom to notify. The notification server 550 can also determine the activity to notify the recipient of, for example through communication with the host server.

In one embodiment, the notification is presented in a feed stream among other notifications through a user interface on the user device according to relevancy to the user determined based on current or recent activity of the user in the web-based collaboration environment. The presentation priority in a user interface in a feed stream can be managed, in whole, or in part, for example, by the priority module 525 using information determined by the notification prioritizer (e.g., notification prioritizer 455 of notification module 390 shown in the example of FIG. 3B).

In one embodiment, the notification server 550 can send notifications to users via SMS (e.g., through the SMS notifier 515). In this instance, the notification server 500 can be coupled to an SMS center which forwards the SMS text message to a mobile device over a cellular network. The notification can be sent via SMS in real time or near real time, or with a delay.

Figure 4:
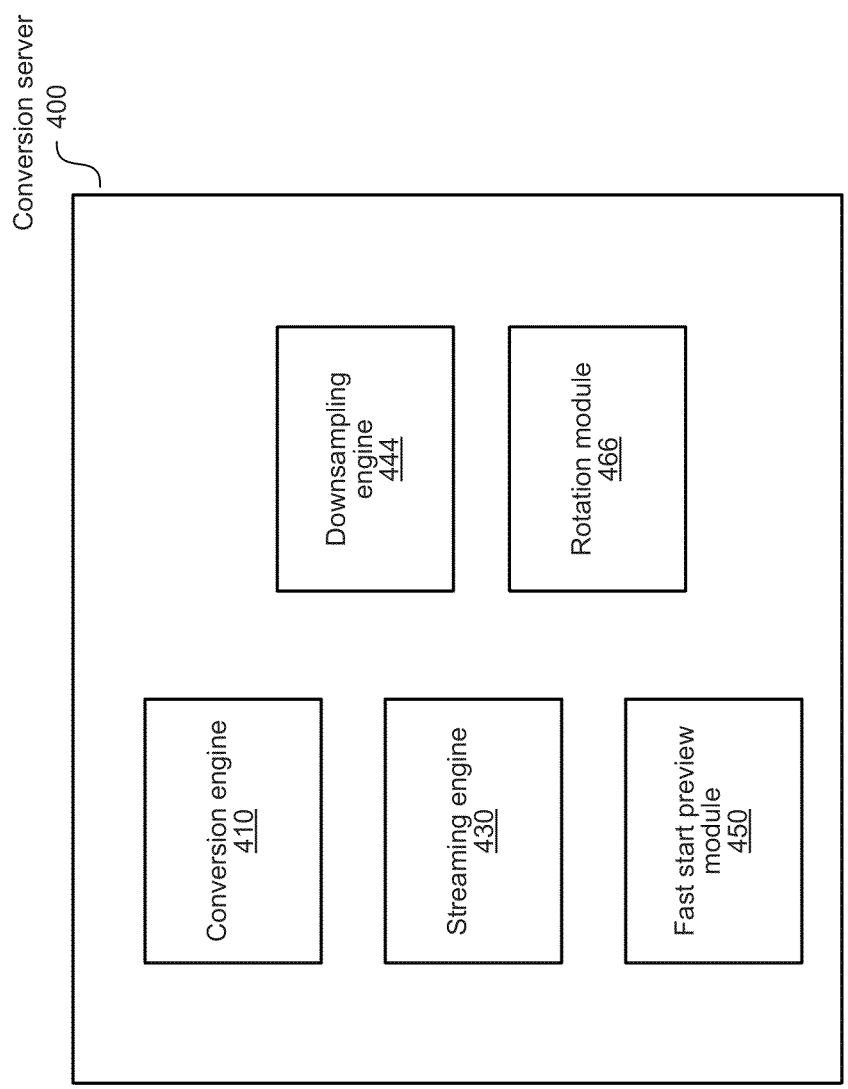
FIG. 4 depicts a block diagram illustrating an example of components in a conversion server for providing conversion of a video file format into a file format suitable for previewing the file in a web-based or online collaboration environment.

FIG. 4 depicts a block diagram illustrating an example of components in a conversion server 400 for converting a video file format into a target file format suitable for previewing the file in a web-based or online collaboration environment. The conversion server 400 of the web-based or online collaboration environment can include, for example, a conversion engine 410, a streaming engine 430, a downsampling engine 444, a fast start preview module 450, and/or a rotation module 466.

One embodiment of the conversion server 400 includes the conversion engine 410 which can run the conversion tools used to convert an input file format to another file format. Non-limiting examples of conversion tools include mencoder and ffmpeg. In one embodiment, the conversion tool manager 410 manages subsystems that are designed to handle specific style formats. For example, because Microsoft Office is ideally suited to convert MSWord and PowerPoint documents, a Windows-based subsystem can be used to handle MS Office file formats.

In one embodiment, the conversion engine 410 can perform a hard-coded conversion process where specific tools are used to convert certain input formats to a specified output format. In one embodiment, the conversion engine 410 uses a path-finding algorithm implemented by the network graph engine 320 described above.

One embodiment of the conversion server 400 includes the streaming engine 430 which can take the video file as it is being converted by the conversion engine 410 and write it directly to a publicly-available location in chunks. The video player can then start reading the data showing the video to the user before the rest of the file has been converted.

One embodiment of the conversion server 400 includes the downsampling engine 444 which can downsample a video file by removing pixels from video frames to reduce the size of the file for converting to a target format for preview. Advantages of downsampling include reducing the time a preview takes to start playing for a user, preventing the preview from starting, stopping, or freezing during playback, and reducing the overall bandwidth usage for the server and the end user.

In one embodiment, a file can be downsampled if it is larger than 360 pixels in the height dimension of the frames. During the downsampling process, the aspect ratio of the frames is maintained. Thus, for sources having a 4:3 aspect ratio, the resulting frame sizes of the video file would be 480×360 pixels, and for wide-format video, the resulting size would be 640×360 pixels. Other downsampling criteria, such as different pixel dimensions of the frames, can also be selected when reducing the size of a file.

In one embodiment, a video file can be downsampled to multiple different conversion sizes, for example, a high resolution version, a medium resolution version, and a low resolution version. In one embodiment, depending upon the tier of service a user pays for, one, two, or all three of the different versions can be made available to the user. For a user paying a premium to subscribe to a higher tier of service, the user would receive more versions than a user subscribing to a lower tier of service. The benefit of receiving more versions having different sizes is that the user then has the option of selecting the most appropriate size or resolution. For example, a low resolution version can be selected for a slow network connection, and a high resolution version can be selected for sharing a video with friends who have a high bandwidth network connection. In one embodiment, if more than one size file is to be produced, the downsampling for each conversion size is performed on the original input file, rather than downsampling a stream of video data multiple times, to minimize the number of conversion errors introduced.

In one embodiment, if a video file is converted from its input format directly to a desired target format, the downsampling can take place prior to the conversion of the file format to reduce the processing time needed to convert the file format. However, if the video file is first converted as part of a multi-step conversion to an intermediate format before being converted to a target format, the unsupported input file format should be converted to the intermediate format first before downsampling for the final conversion to the target format.

With traditional video file downloading, a user is not able to access the video file before it has completely downloaded because a video player needs the metadata encoded in the video file, and the metadata is usually found at the end of the file. Thus, the video player needs to wait until the video file is fully loaded prior to playing the video. One embodiment of the conversion server 400 includes the fast start preview module 450 which can move the metadata from the end of the file to the beginning of the file. By moving the metadata to the beginning of the file, the preview player can begin playing the video before the user has fully downloaded the file. In one embodiment, the fast start preview module 450 uses the qt-faststart library to move the metadata to the beginning of the video file.

One embodiment of the conversion server 400 includes the rotation module 466 which uses a rotation identification tool to identify the embedded orientation data that a digital camera uses to display a video. Once the rotation module 466 has identified the orientation, it sends this information to the conversion tool(s) as a flag to correct the video for playback in the video preview in the online collaboration environment. It is important to identify the orientation data of a video file because video taken upside-down with a digital camera that plays in an appropriate orientation in the digital camera and most desktop video players would appear upside-down in the video preview.

Figure 5:
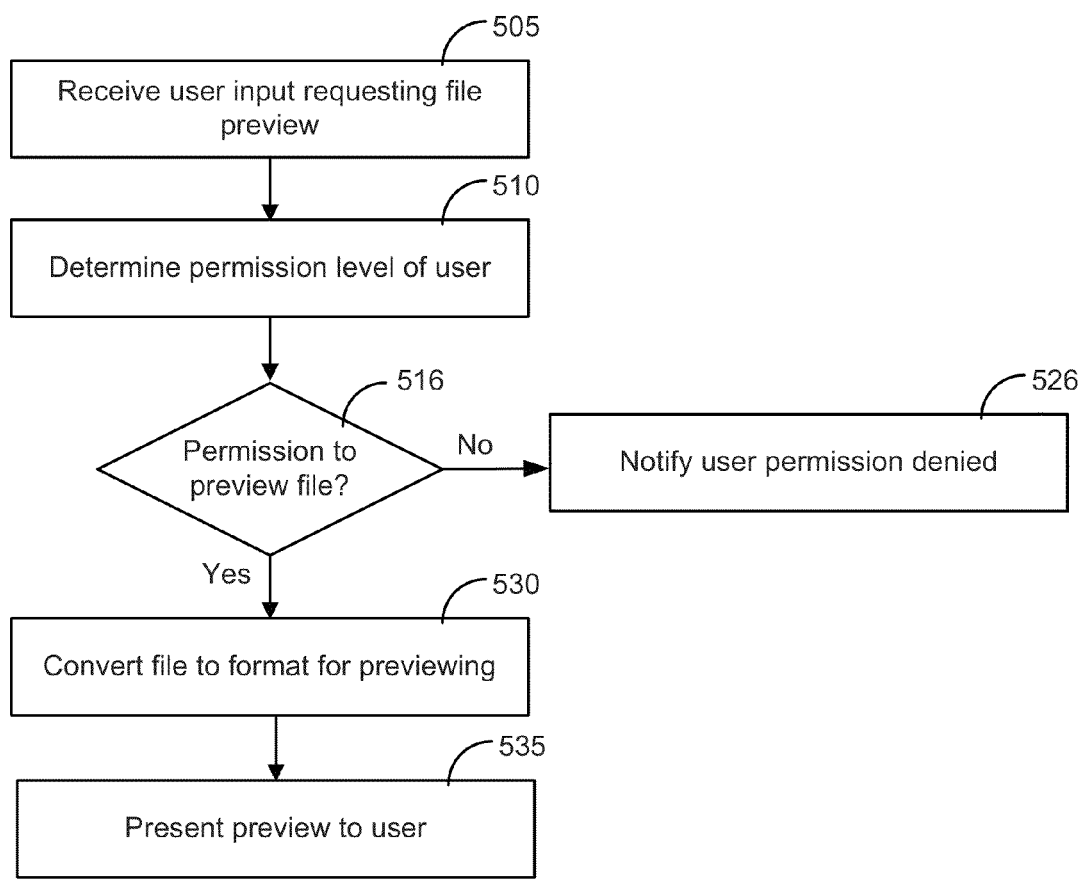
FIG. 5 depicts a flow chart illustrating an example process for determining if a user has permission to access a file preview.

FIG. 5 depicts a flow chart illustrating an example process for determining if a user has permission to access preview of a file.

At block 505, the system receives user input from a user requesting a preview of a file. In one embodiment, the user can request the preview by clicking on the file in the workspace of the online collaboration environment.

Then at block 510, the system determines the permission level of the requesting user. In one embodiment, a first type of permission level, e.g. an editor, allows a user to have full read and write access to a workspace, including downloading or viewing a preview of the contents of the workspace as well as uploading new content to the workspace. A second type of permission level, e.g. a viewer, allows a user to have full read access to a workspace such that the user can download or view a preview of contents of the workspace but not upload or edit contents of the workspace. A third type of permission level, e.g. an uploader, can allow a user to have limited write access to contents of a workspace such that the user can see items in the workspace but not download or view the items, while being permitted to upload new content to the workspace.

At decision block 516, the system determines if the user has permission to preview the file. If the permission level of the user does not allow previewing (block 516—No), at block 526 the system notifies the user that permission to view the preview is denied. If the permission level of the user allows previewing (block 516—Yes), at block 530 the system converts the file to an appropriate format for previewing. Then at block 535 the system presents the preview to the user. In one embodiment, the file is a video file. In this case, the file does not have to finish converting before the file is presented to the user as a preview, as discussed above with respect to streaming a video file.

Figure 6:
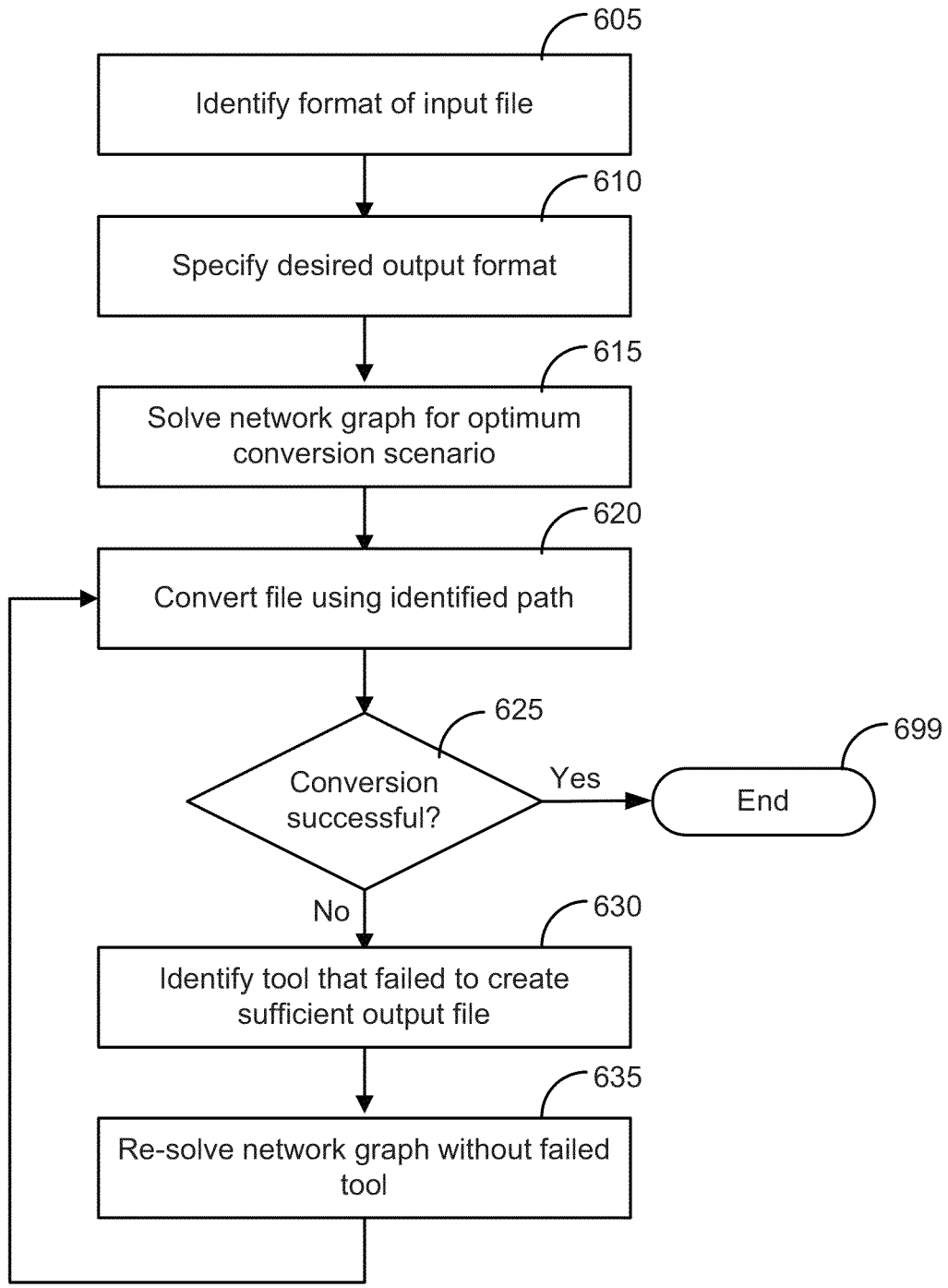
FIG. 6 depicts a flow chart illustrating an example process for finding an optimum path using different conversion tools for converting an input file format to a target file format.

FIG. 6 depicts a flow chart illustrating an example process for finding an optimum path using different conversion tools for converting an input file format to a target file format.

At block 605, the system identifies the format of an input file that has been uploaded by a user. Then at block 610, the system specifies the desired output format appropriate for presenting a preview of the file. In one embodiment, output size and/or preview type is also specified. Output size can be used to limit the size of the output file. Thus, if the converted file exceeds the specified threshold, the file can be re-processed, reduced in size, or not used. In one embodiment, output dimensions are specified because in different applications, different dimensions of previews may be used. For example, a preview can be displayed as a thumbnail on a file listing page (e.g. FIG. 10) or as a large display on a file preview page (e.g. in FIG. 11). With both of these previews, the files are the same format, but have different dimensions, thus the previews with different dimensions are different system outputs.

Next, at block 615, the system solves the network graph for the optimum conversion scenario using the available conversion tools. The system takes into account the priority cost of using each of the tools to determine the optimum path. Then at block 620, the system converts the file using the identified conversion scenario path.

At decision block 625, the system determines whether the conversion of the input file to the targeted output format was successful. If the conversion was successful (block 625—Yes), the process ends at block 699. If the conversion failed (block 625—No), at block 630, the system identifies the conversion tool that failed to create a sufficient output file. If the faulty conversion tool was used to convert to an intermediate file format, subsequent conversions from the output of the faulty tool would not be successful.

At block 635, the system re-solves the network graph without using the nodes associated with the faulty conversion tool to identify the next optimum path using the available conversion tools. The process returns to block 620 to convert the input file using the newly identified path.

Figure 7:
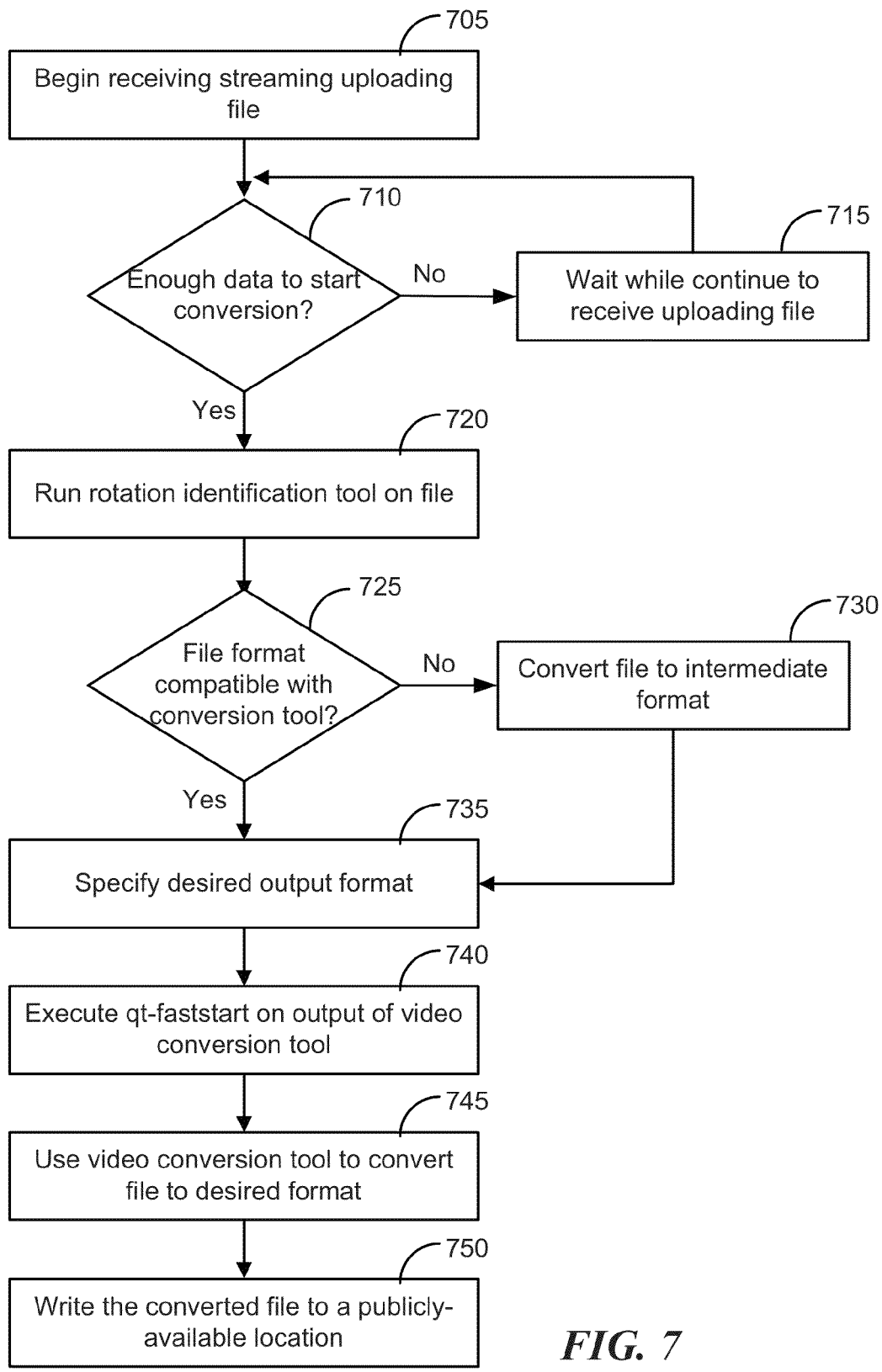
FIG. 7 depicts a flow chart illustrating an example process for converting a format of a video file to a target format for previewing.

FIG. 7 depicts a flow chart illustrating an example process for converting a format of a vide© file to a target format for previewing.

At block 705, the system begins to receive an uploading video file streamed from a user. Then at decision block 710, the system determines if sufficient data has been received to start converting the file to a desired target format. If sufficient data has not yet been received (block 710—No), at block 715 the system waits and continues to receive the uploading file and returns to decision block 710.

If sufficient data has been received (block 710—Yes), at block 720, the system runs a rotation identification tool on the input file to determine the orientation of the video data. Then at decision block 725, the system determines if the file format is compatible with the conversion tool or tools that the system has available., for example, mencoder. If the file format is not compatible (block 725—No), at block 730 the system converts the input file to an intermediate format that is compatible with the conversion tool and continues to block 735. If the file format is compatible with the conversion tool (block 725—Yes), at block 735 the system specifies the desired output format to the conversion tool.

The system applies the qt-faststart program at block 740 to the file in order to move the metadata to the beginning of the video file. This allows the output file to be streamed to the user while the conversion of the remainder of the file occurs if the user wishes to do so.

Then at block 745, the system uses the video conversion tool to start converting the file, whether it is the input file or an intermediate format file, to the desired format. The conversion process on the file does not have to finish before streaming the converted portions to the user for previewing. The converted portions of the file is stored at block 750. The converted file can be written directly to a publicly-available location in chunks, and the video player can start reading the data and showing the video to the user before the file is finished converting.

Figure 8:
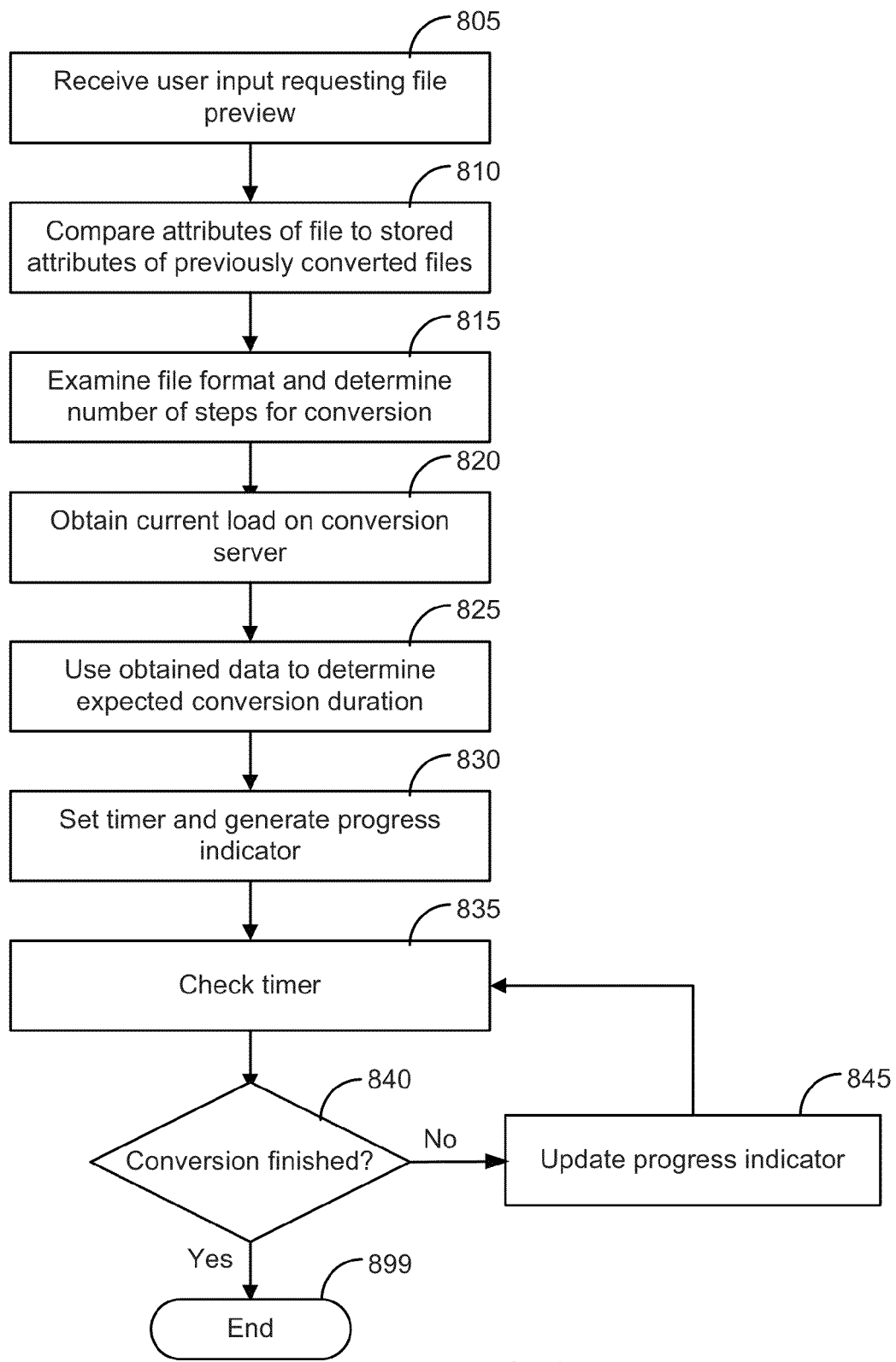
FIG. 8 depicts a flow chart illustrating an example process for generating a progress indicator for indicating the amount of time remaining until a file has been converted.

FIG. 8 depicts a flow chart illustrating an example process for generating a progress indicator that shows the amount of time remaining for converting a file.

At block 805, the system receives input from a user requesting a file preview. Next, at block 810, the system compares the attributes of the file to analytics stored in a database containing attributes of previously converted files. Attributes can include the size of the file and the file format.

At block 815, the system examines the format of the file to be previewed and determines the number of intermediate steps needed, if any, to convert the file to a target suitable for previewing.

At block 820, the system obtains the current load information on the conversion server(s).

Then at block 825, the system uses the obtained data to determine an expected conversion duration. The system sets a timer and generates a progress indicator for displaying to the user at block 830. The progress of the conversion servers in performing the file conversion can be displayed in any suitable form, such as a bar or a pie.

At block 835, the system checks the timer, and at decision block 840, the system determines if the conversion has finished. If the conversion has completed (block 840—Yes), the process ends at block 899. If the conversion has not finished (block 840—No), at block 845 the system updates the progress indicator and returns to block 835 to check the timer.

Figure 9:
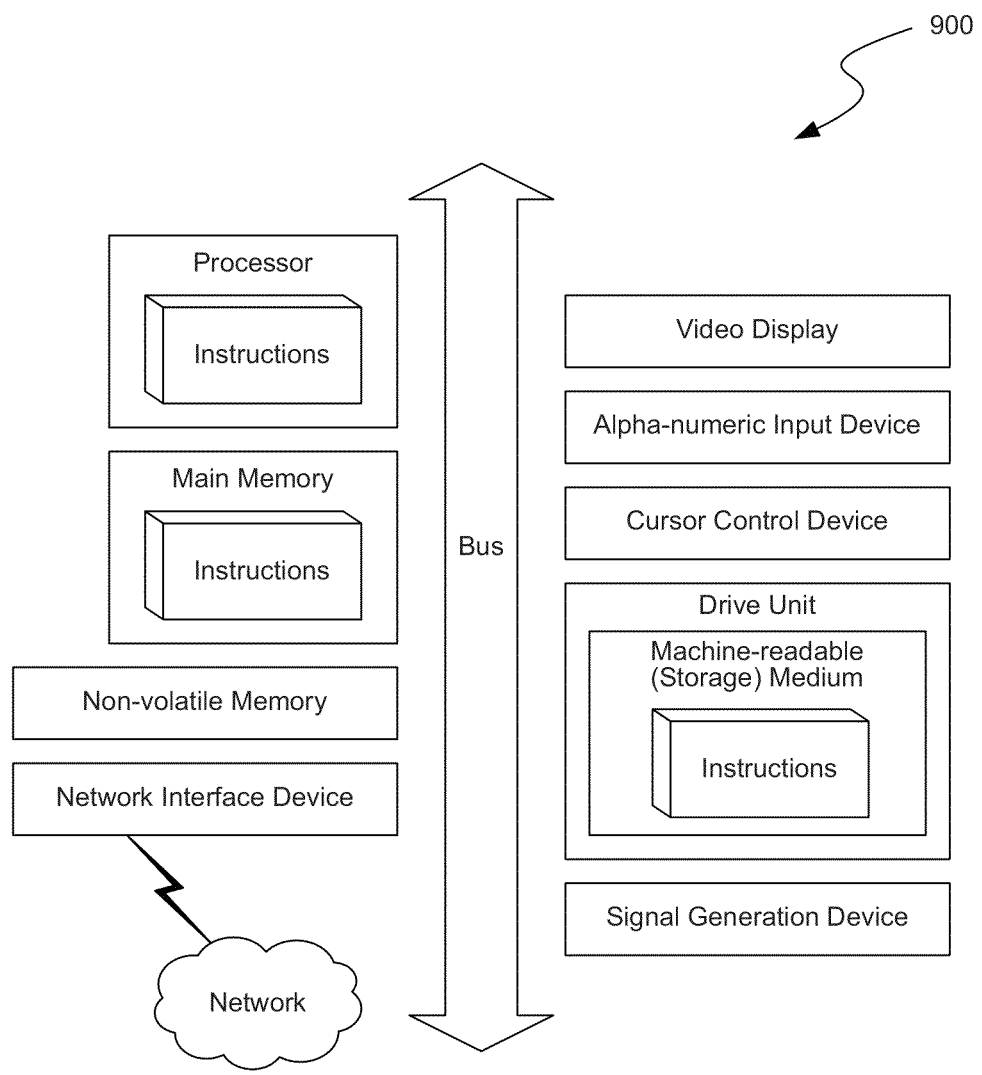
FIG. 9 shows a diagrammatic representation of a machine in the example form of a computer system within which a set of instructions, for causing the machine to perform any one or more of the methodologies discussed herein, may be executed.

FIG. 9 shows a diagrammatic representation of a machine 900 in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 900 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications, he firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

CONCLUSION

Unless the context clearly requires otherwise, throughout the description and the claims, the words "comprise," "comprising," and the like are to be construed in an inclusive sense (i.e., to say, in the sense of "including, but not limited to"), as opposed to an exclusive or exhaustive sense. As used herein, the terms "connected," "coupled," or any variant thereof means any connection or coupling, either direct or indirect, between two or more elements. Such a coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a Hat of two or more items, covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. While processes or blocks are presented in a given order in this application, alternative implementations may perform routines having steps performed in a different order, or employ systems having blocks in a different order. Some processes or blocks may be deleted, moved, added, subdivided, combined, and/or modified to provide alternative or subcombinations. Also, while processes or blocks are at times shown as being performed in series, these processes or blocks may instead be performed or implemented in parallel, or may be performed at different times. Further any specific numbers noted herein are only examples. It is understood that alternative implementations may employ differing values or ranges.

The various illustrations and teachings provided herein can also be applied to systems other than the system described above. The elements and acts of the various examples described above can be combined to provide further implementations of the invention.

Any patents and applications and other references noted above, including any that may be listed in accompanying filing papers, are incorporated herein by reference. Aspects of the invention can be modified, if necessary, to employ the systems, functions, and concepts included in such references to provide further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

While certain aspects of the invention are presented below in certain claim forms, the applicant contemplates the various aspects of the invention in any number of claim forms. For example, while only one aspect of the invention is recited as a means-plus-function claim under 35 U.S.C. §112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for.") Accordingly, the applicant reserves the right to add additional claims after filing the application to pursue such additional claim forms for other aspects of the invention.

We claim:
1. A computer implemented method for predicting a duration for converting a file to a target format for previewing using computing elements, the method comprising:
    comparing attributes of the file with attributes of previously converted files;

predicting the duration based upon an average of conversion times for previously converted files with the attributes; and causing to be displayed an indicator configured to dynamically provide a time remaining for completion of the conversion of the file based upon the predicted duration.

2. The method of claim 1, wherein attributes of the file comprise one or more of: size of the file, format of the file, and number of steps to be used for converting the file, wherein a step corresponds to each format conversion of the file performed to arrive at the target format.

3. The method of claim 2, wherein for text-based files, attributes of the file further comprise a number of pages of the file, wherein for image files, attributes of the file further comprise one or more of a source width and a source height of a frame of the file prior to conversion, and a target width and a target height of a target frame in the target format, and wherein for video files, attributes of the file further comprise one or more of a play length, a source width and a source height of a frame of the file prior to conversion, and a target width and a target height of a target frame in the target format.

4. The method of claim 1, further comprising adjusting the predicted duration based upon a current load on a system used to perform the conversion of the file to the target format.

5. The method of claim 4, further comprising adjusting the predicted duration based upon reported progress of a step of the conversion of the file to the target format.

6. A computer implemented method for decreasing a time for converting a video file to a target format for previewing using computing elements, the method comprising:

downsampling the video file to a first downsampled video file, wherein the video file has been uploaded to a web-based collaboration platform;

converting the first downsampled video file to a first output file having the target format for previewing using a preview module of a conversion server; and causing to be displayed the first output file for previewing, wherein the converting is performed on a conversion engine of the conversion server.

7. The method of claim 6, wherein downsampling comprises reducing a height of frames of the video file to a preselected number of pixels while maintaining an aspect ratio of the video file.

8. The method of claim 6, further comprising
evaluating a load on a system of distributed conversion servers;
using a distributed queuing system to determine which of the distributed conversion servers to use for performing the downsampling and the conversion.

9. The method of claim 8, further comprising
using timing information collected from converting previous files to determine which of the distributed conversion servers to use for performing the downsampling and the conversion to increase a throughput of the system.

10. The method of claim 6, further comprising identifying orientation data in the video file and conveying the orientation data to a video player for use in displaying the first output file.

11. The method of claim 6, further comprising:
providing a notification of the previewing by the user to another user of the web-based collaboration platform.

12. The method of claim 11, wherein the notification is accessible by the other user when the previewing is displayed.

13. The method of claim 11, wherein the notification is presented in a feed stream through a user interface to the web-based collaboration platform.

14. The method of claim 11, wherein the other user meets a criteria for receiving the notification.

15. A computer implemented method performed using computing elements, the method comprising:

downsampling a video file to a first downsampled video file, wherein the video file has been uploaded to a web-based collaboration platform;

converting the first downsampled video file to a first output file having a target format; and downsampling the video file to a second downsampled video file, wherein the second downsampled video file is smaller than the first downsampled video file;

converting the second downsampled video file to a second output file having the target format; and providing the first output file to a user for previewing if the user subscribes to a higher tier of service with the web-based collaboration platform;

providing the second output file to the user for previewing if the user subscribes to a lower tier of service with the web-based collaboration platform.

16. The method of claim 15, further comprising:
providing the first output file and the second output file to the user to select for previewing, if there is only a single tier of service offered by the web-based collaboration platform.

17. The method of claim 15, wherein downsampling comprises reducing a height of frames of the video file to a preselected number of pixels while maintaining an aspect ratio of the video file.

18. The method of claim 15, further comprising
evaluating a load on a system of distributed conversion servers;
using a distributed queuing system to determine which of the distributed conversion servers to use for performing the downsampling and the conversion.

19. The method of claim 18, further comprising
using timing information collected from converting previous files to determine which of the distributed conversion servers to use for performing the downsampling and the conversion to increase a throughput of the system.

20. The method of claim 15, further comprising:
providing a notification of the previewing by the user to another user of the web-based collaboration platform.

21. The method of claim 20, wherein the notification is accessible by the other when the previewing is displayed.

22. The method of claim 20, wherein the notification is presented in a feed stream through a user interface to the web-based collaboration platform.

23. A computer implemented method performed using computing elements, the method comprising:

downsampling a video file to a first downsampled video file, wherein the video file has been uploaded to a web-based collaboration platform;

converting the first downsampled video file to a first output file having a target format; and downsampling the video file to a second downsampled video file, wherein the second downsampled video file is smaller than the first downsampled video file;

converting the second downsampled video file to a second output file having the target format; and providing the first output file and the second output file to a user to select for previewing if the user subscribes to a higher tier of service with the web-based collaboration platform;

offering only one of the first output file or the second output file to the user for previewing if the user subscribes to a lower tier of service with the web-based collaboration platform.

24. The method of claim 23, wherein downsampling comprises reducing a height of frames of the video file to a preselected number of pixels while maintaining an aspect ratio of the video file.

25. The method of claim 23, further comprising:
providing a notification of the previewing by the user to another user of the web-based collaboration platform.

26. The method of claim 25, wherein the notification is accessible by the other user when the previewing is displayed.

27. The method of claim 25, wherein the notification is presented in a feed stream through a user interface to the web-based collaboration platform.

28. A computer implemented method for decreasing a time for converting a video file to a target format for previewing using computing elements, the method comprising:
converting the video file to an intermediate format file, wherein the video file has been uploaded to a web-based collaboration platform;
downsampling the intermediate format file;
converting the downsampled intermediate format file to a target format file
causing to be displayed the target format file for previewing.

29. The method of claim 28, wherein downsampling comprises reducing a height of frames of the video file to a preselected number of pixels while maintaining an aspect ratio of the video file.

30. The method of claim 28, further comprising:
providing a notification of the previewing by the user to another user of the web-based collaboration platform.

31. The method of claim 30, wherein the notification is accessible by the other user when the previewing is displayed.

32. The method of claim 30, wherein the notification is presented in a feed stream through a user interface to the web-based collaboration platform.

33. A computer implemented method of streaming a video file to a user for previewing prior to completing conversion of the video file to a target format using computing elements, the method comprising:
moving metadata in the video file to a beginning of the video file, wherein the video file has been uploaded to a web-based collaboration platform;
as the video file is being converted to the target format, writing sections of the converted portions of the video file to a location accessible by a video player;
causing the video player to display the converted portions of the video file to the user while a remainder of the video file is converted to the target format.

34. The method of claim 33, further comprising downsampling the video file prior to converting the video file.

35. The method of claim 33, further comprising
evaluating a load on a system of distributed conversion servers;
using a distributed queuing system to determine which of the distributed conversion servers to use for performing the conversion.

36. The method of claim 35, further comprising
using timing information collected from converting previous files to determine which of the distributed conversion servers to use for performing the conversion to increase a throughput of the system.

37. The method of claim 33, further comprising identifying orientation data in the video file and conveying the orientation data to a video player for use in displaying the first output file.

38. The method of claim 33, further comprising:
providing a notification of the previewing by the user to another user of the web-based collaboration platform.

39. The method of claim 38, wherein the notification is accessible by the other user to when the previewing is displayed.

40. The method of claim 38, wherein the notification is presented in a feed stream through a user interface to the web-based collaboration platform.

41. The method of claim 38, wherein the other user meets a criteria for receiving the notification.

42. A system, comprising:
one or more conversion servers, wherein each conversion server includes a conversion engine that is configured to convert an input format of a file to a target format; and
a progress indicator engine configured to determine a predicted duration for converting the file to the target format and providing a dynamic indicator to indicate to a user a time remaining for the conversion, wherein the target format of the file is used for previewing using a preview module of the one or more conversion servers.

43. The system of claim 42, further comprising a downsampling engine configured to downsample the file to decrease the conversion time.

44. The system of claim 43, further comprising a load balancing engine configured to determine to which of the conversion servers to send the file for conversion.

45. A system, comprising:
means for comparing attributes of the file with attributes of previously converted files;
means for predicting the duration based upon an average of conversion times for previously converted files with similar attributes; and
means for causing to be displayed an indicator configured to dynamically provide a time remaining for completion of the conversion of the file based upon the predicted duration.

46. A non-transitory machine readable storage medium encoded with instructions for performing a method for predicting a duration for converting a file to a target format for previewing, the instructions comprising:
instructions to compare attributes of the file with attributes of previously converted files;
instructions to predict the duration based upon an average of conversion times for previously converted files with the attributes; and
instructions to cause to be displayed, on a display, an indicator configured to dynamically provide a time remaining for completion of the conversion of the file based upon the predicted duration.

47. The non-transitory machine readable storage medium of claim 46, wherein attributes of the file comprise one or more of: size of the file, format of the file, and number of steps to be used for converting the file, wherein a step corresponds to each format conversion of the file performed to arrive at the target format.

48. The non-transitory machine readable storage medium of claim 46, further comprising instructions to adjust the predicted duration based upon a current load on a system used to perform the conversion of the file to the target format.

* * * * *